United States Patent
Matsumoto (10) Patent No.: US 6,549,207 B1
(45) Date of Patent: Apr. 15, 2003

(54) METHOD AND APPARATUS FOR DISSOLVING IMAGE ON DISPLAY SCREEN

(76) Inventor: Kenzo Matsumoto, 1099-2, Ooaza-Yamaguchi, Tokorozawa-si Saitama-ken (JP), 359-1145

( * ) Notice: Subject to any disclaimer, the term of this patent is extended or adjusted under 35 U.S.C. 154(b) by 401 days.

(21) Appl. No.: 09/588,031

(22) Filed: Jun. 5, 2000

(51) Int. Cl.[7] ............................................... G06T 13/00
(52) U.S. Cl. ..................................... 345/473; 348/578
(58) Field of Search ................................. 348/239, 578, 348/594, 595, 608, 642, 720; 382/118, 170, 190, 303; 345/473

(56) References Cited

U.S. PATENT DOCUMENTS

| | | | |
|---|---|---|---|
| 5,671,020 A | * | 9/1997 | Law ........................... 348/608 |
| 5,689,575 A | * | 11/1997 | Sako et al. ................. 382/118 |
| 6,323,914 B1 | * | 11/2001 | Linzer ........................ 348/578 |
| 6,362,850 B1 | * | 3/2002 | Alsing et al. ............... 348/239 |

* cited by examiner

Primary Examiner—Mark Zimmerman
Assistant Examiner—Lance W. Sealey (57) ABSTRACT

A method and apparatus for dissolving an image on a display screen. The pixels of the objective image are divided into a plurality of groups in such a manner that the pixels in each group are dispersed in the image. Then one of the pixel groups is selected and the pixel values of the selected group are read from first storage means to multiply them by a weight. The resultant weighted pixel values are stored respectively in the storage locations, corresponding to the selected pixel group, within second storage means, from which the weighted pixel values are read in a predetermined order to display one of the sequential images on the display screen. The selecting, reading, multiplying, and storing procedures are repeated, wherein the respective pixel groups are selected cyclically and the weight is increased or decreased gradually as the repetition progresses.

12 Claims, 6 Drawing Sheets

METHOD AND APPARATUS FOR DISSOLVING IMAGE ON DISPLAY SCREEN

BACKGROUND OF THE INVENTION

The present invention generally relates to visual effect implementations for the images on the screen of a display device, and more specifically to a method and apparatus for displaying a dissolving image by providing sequential images to form the dissolving transition on the screen.

On the screen of a display device, a computer can display an image that appears or disappears gradually as a fade-in or fade-out effect. Each of the visual effects, namely dissolve effect, is achieved by manipulating the picture elements, or pixels, of the image.

An array of a large number of pixels displayed at respective intensities forms an image on the display screen. The information on the pixel intensities is supplied through video signals by the computer. The computer holds values for the respective pixels in a storage device, from which the pixel values are read in a sequence to produce the video signals.

The display device, typically comprising a cathode ray tube (CRT), performs raster scans at a certain repetition rate to display images on its screen. This repetition rate, or screen scan rate, must be high enough for displaying flickerless images and is typically selected to greater than 50 Hz according to the human eye nature. The pixel values of images to be displayed on the screen, therefore, should be read from the storage device at the same rate to create the video signals for the display.

The computer device may produce a dissolving image on the screen by providing the display with the video signals for displaying a series of images that vary their intensities progressively based on their respective phases in the dissolving process. The intensities of the images can be modified by weighting their pixel values. Therefore, the computer may repeatedly multiply the pixel values by a weight while progressively increasing or decreasing the weight image by image. Then the video signals can be produced based on the weighted pixel values to display the images sequentially on the display screen to form the dissolving image.

Enhanced processing powers of Central Processing Units (CPUs) and peripheral devices in recent years allow computer devices to provide various computer graphics in a realistic fashion, thereby attracting the users. However, computers, such as those for personal use, are still deficient in processing speeds, and thus are limited in capabilities for rendering images including those in dissolving transitions. Especially larger size images represented by a larger amount of pixels require longer processing time for aforementioned weighting procedures, so that the frame rates in displaying the sequential images are deteriorated, resulting in a discontinuous dissolve effect, or a dissolving transition in an undesirable stepping manner, on the display screen.

BRIEF SUMMARY OF THE INVENTION

It is the primary object of the present invention to provide a method and apparatus capable of smoothly dissolving an image on a display screen.

In accordance with the invention, sequential images to be successively displayed on the screen to form the dissolving transition of the objective image are generally provided by applying a progressively-varied weight to the pixel values of the objective image, which is composed of a two-dimensional pixel array.

For shortening the time required to create the respective images forming the dissolving transition, the pixels of the objective image, according to the invention, are divided into a plurality of groups in such a manner that the pixels in each group are dispersed in the image. Then one of the pixel groups is selected and all the pixel values of the selected group are read from first storage means to multiply them by a weight respectively. The resultant weighted pixel values are stored respectively in the storage locations, corresponding to the selected pixel group, within second storage means. The selecting, reading, multiplying, and storing procedures are repeated, wherein the respective pixel groups are selected cyclically and the weight is increased or decreased gradually as the repetition of the procedures progresses. In parallel with this repetition, the weighted pixel values are cyclically read from the second storage means, in each reading cycle the pixel values corresponding to the pixel groups being read in a predetermined order to display one of the sequential images on the screen.

According to the present invention, the respective images to form the dissolving transition are created in shorter time periods due to the reduced number of pixels to be weighted in each image. Therefore, the images can be displayed at higher frame rates, resulting in a smooth dissolve effect on the display screen.

DETAILED DESCRIPTION OF THE INVENTION

Figure 1:
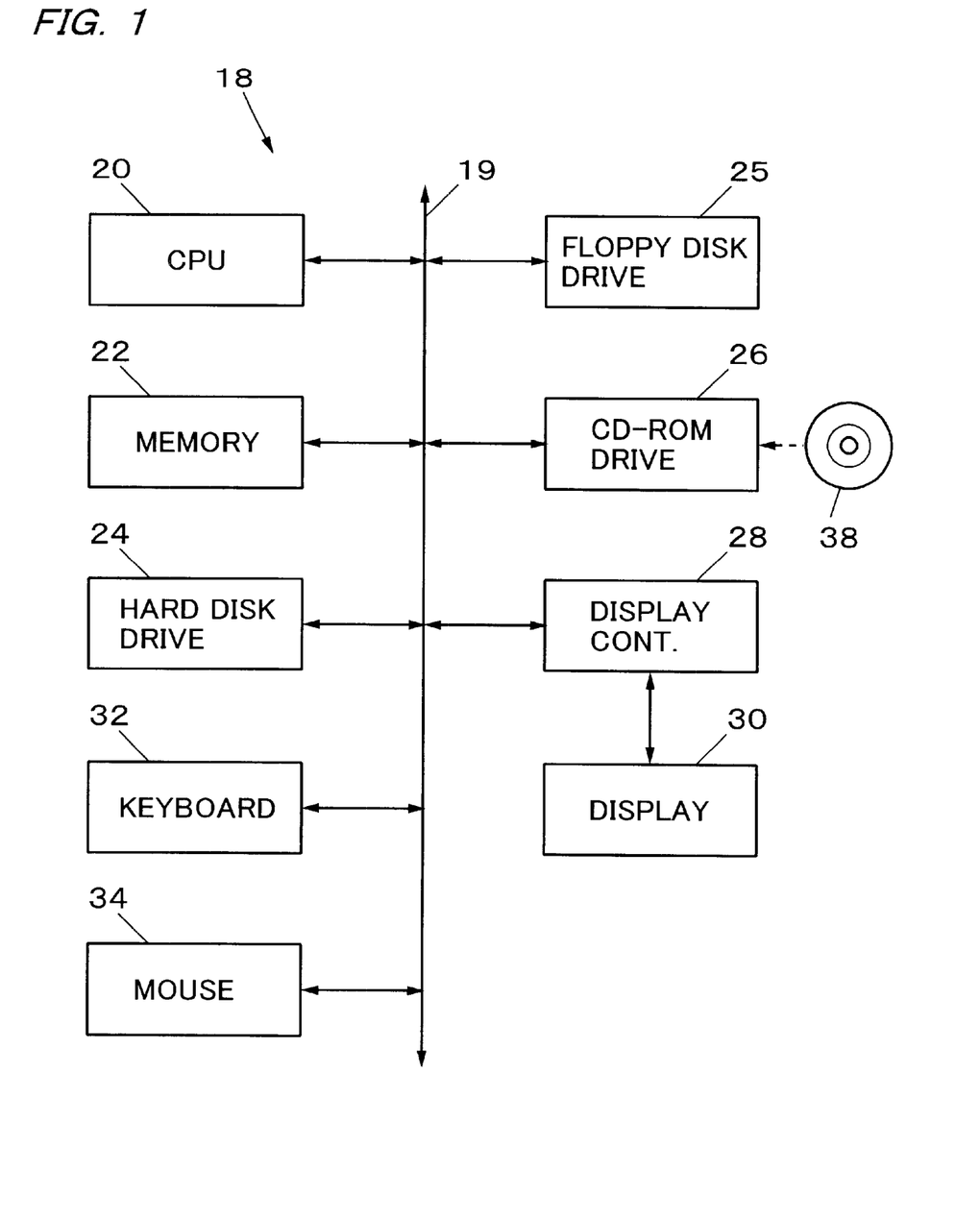
FIG. 1 is a block diagram of a computer system for carrying out the embodiments of the present invention.

FIG. 1 illustrates a block diagram of a computer system for implementing the embodiments of the present invention. A computer 18 shown in FIG. 1 includes a central processing unit (CPU) 20 and a system memory 22, which are connected with each other through a system bus 19. The CPU 20 reads the memory 22 to acquire instruction codes and data for its operation. The memory 22 may comprise random access and/or read only memory devices connected to the bus 19.

The computer 18 also includes a hard disk drive 24, floppy disk drive 25, and CD-ROM drive 26, which are respectively connected to the system bus 19 by appropriate interfaces. A CD-ROM 38 may be loaded into the CD-ROM drive 26 to be read by the CPU 20 through the system bus 19, and A floppy disk (not shown) can be loaded to the floppy disk drive 25 to be read or written by the CPU 20.

A display 30, which may be specifically a CRT display or a device including a liquid crystal display (LCD), is connected to a display controller 28 to be supplied with video signals therefrom to display images on the display screen. The images can be graphical, alphanumeric, and so forth but typically graphical in the embodiments of the present invention described herein. The display controller 28 comprises a storage device, from which pixel values of an image are cyclically read in a predetermined sequence according to the raster scan in the display 30, thereby generating video signals together with synchronized signals to display the image on the display screen at a sufficiently-high screen scan rate. The pixel values are typically sent to the storage in the display controller 28 from the system memory 22 under the control by the CPU 20.

The computer 18 is also equipped with a keyboard 32 and mouse 34 or pointing device, which are connected to the system bus 19 through proper interfaces respectively. The user can input commands and data into the computer 28 by operating those devices.

A computer program for implementing dissolve effects in accordance with the present invention resides, for example, on the hard disk in the drive 24 and is read by the CPU 20 to be loaded in the system memory 22. The CPU thereafter operates based on the program in the memory 22 to display dissolving images on the display screen.

Figure 2:
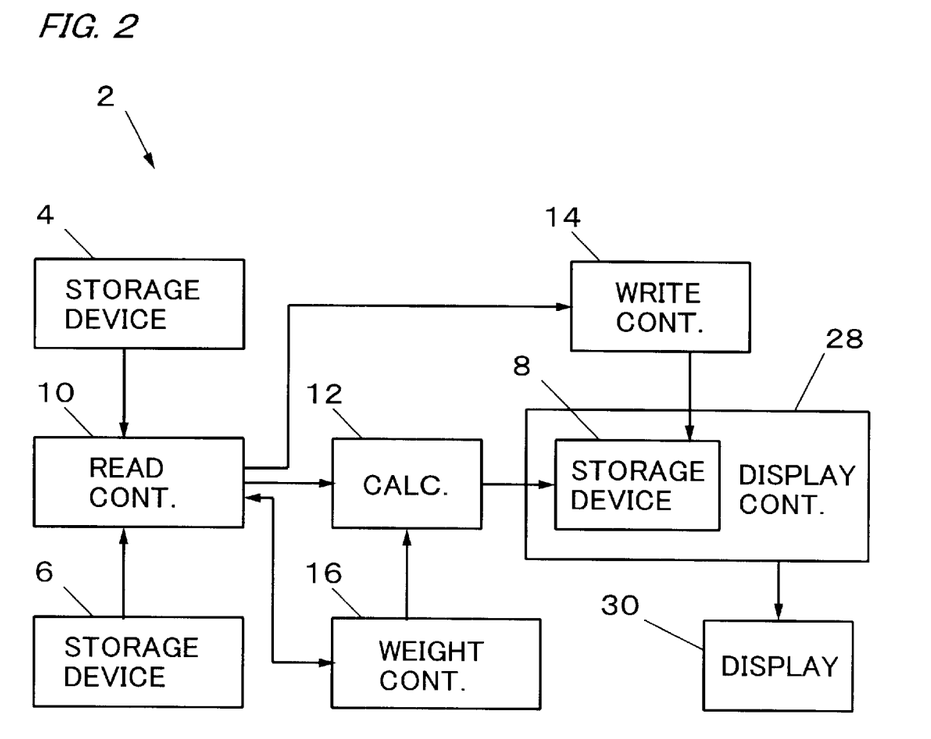
FIG. 2 is a block diagram of an apparatus constituted by the computer system shown in FIG. 1 to achieve dissolve effects according to the invention.

FIG. 2 is a block diagram of an apparatus constituted by the computer system shown in FIG. 1. An apparatus 2 shown in FIG. 2, on which the embodiments of the present invention is implemented, displays fade-in and fade-out images simultaneously on the screen of the display 30. Therefore, on the screen showing a first image at an ordinary intensity initially, a second image appears gradually by increasing its intensity while the first image progressively disappears with its intensity decreasing to be replaced by the second image finally.

Although the apparatus 2 is designed to handle monochromatic images for the sake of simplicity in understanding the principle of the present invention, for those skilled in the art will recognize that the invention may also be implemented in an apparatus capable of color image presentation to provide dissolving color pictures on its display screen.

Figure 3:
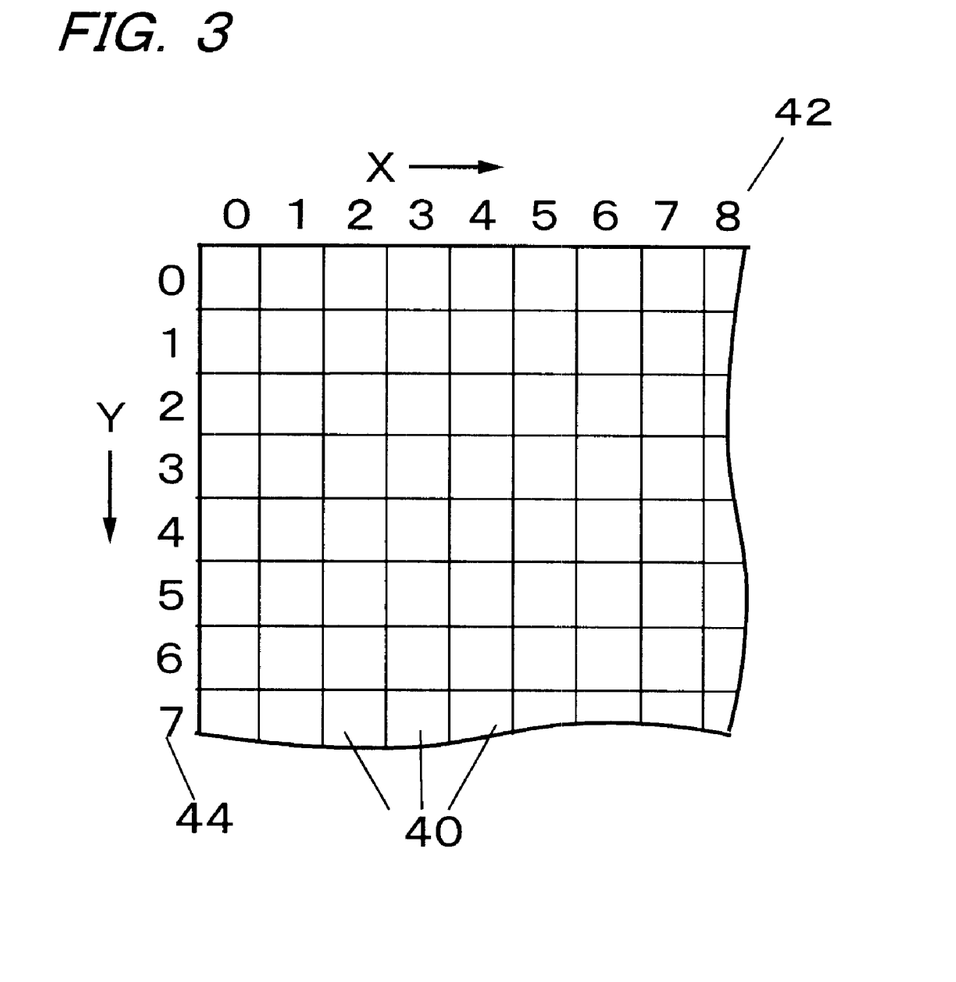
FIG. 3 is a diagram illustrating partly the arrangement of the storage locations in the storage devices comprised by the apparatus shown in FIG. 2.

The storage devices 4 and 6 shown in FIG. 2, as the first storage means according to the present invention, are provided in the apparatus 2 to hold the pixel values of the first and second objective images respectively. FIG. 3 illustrates partly the storage location arrangement in the storage devices 4 and 6, wherein each small square represents storage location 40 for storing a pixel value. The locations 40 are illustratively arranged in a matrix in which each column is designated by an x-address 42 and each row by a y-address 44. Consequently, respective locations 40 in the first and second storage devices 4 and 6 can be accessed by specifying combinations of the x- and y-addresses.

The pixels in the first and second images are respectively arranged in the same way as the storage locations 40 in FIG. 3 with each pixel corresponding to each location 40, and the pixel values of each image are stored in the corresponding locations 40 of the storage device 4 or 6. Each pixel value of the first and second images is typically represented by an eight-bit number, or 0-255, but other appropriate numbers may be utilized for the pixel value.

The apparatus 2 includes a read controller 10 to read the pixel values of the two images at the same time from the storage devices 4 and 6. The read controller 10 reads the pixel values from the storage devices sequentially in such a manner that it accesses the respective storage location rows, shown in FIG. 3, in the y-address order to read in each row the pixel values successively according to the x-address order, or the location column sequence. The read controller 10 repeats to read respective pixel values at a predetermined cycle time for each pixel until the whole pixel values of the images are read.

The read controller 10, furthermore, serves as the dividing, selecting, and controlling means in accordance with the present invention. The functioning of the controller 10 as those means will be described in detail hereinafter.

A calculator 12, together with a weight controller 16, in the apparatus 2 serves as the multiplying means according to the present invention and repeatedly receives the pixel values of the images from the read controller 10 to perform calculations including multiplications of the pixel values and weights supplied by the weight controller 16. The weight controller 16 outputs first and second weights corresponding to the first and second images respectively and decreases the first weight gradually according to the progress of the dissolve transitions while increases the second weight in the same manner. The calculator 12 writes the resultant weighted pixel values in the storage device 8 within the display controller 28 under the control by the write controller 14 as the storing means according to the present invention. The write controller 14 specifies the storage locations in the storage device 8, in which the weighted pixel values from the calculator 12 should be stored.

The display controller 28, as described above, cyclically reads the pixel values from the storage device 8, or the second storage means in accordance with the invention, in a predetermined sequence according to the raster scan in the display 30, thereby generating video and synchronized signals to display images on the display screen. The storage device 8 has an address configuration similar to those of storage devices 4 and 6, and thus, as shown in FIG. 3, comprises storage locations 40 arranged in a matrix illustratively in which each column is designated by an x-address and each row by a y-address. The pixel values of an image are write to or read from the corresponding locations 40 by accessing them with combinations of x- and y-addresses in the storage device 8.

The display controller 28 reads the pixel values from the storage device 8 sequentially in such a manner that it accesses the respective storage location rows in the y-address order to read in each row the pixel values successively according to the x-address order. The display controller 28 repeats this reading procedure to produce the video signals for the display 30 at a frequency sufficiently high to provide flickerless images on the display screen. The display controller 28 may repeat the reading operation synchronously or asynchronously with those for the storage devices 4 and 6 performed by the controller 10. Using the signals, the device 30 displays horizontal scan lines, each of which comprises the successive row pixels of an image, from top to bottom on the display screen to form a complete image.

The aforementioned storage devices 4 and 6 may be constituted by the system memory 22 of the computer 18 shown in FIG. 1, while the read controller 10, calculator 12, weight controller 16, and write controller 14 by the CPU 20, which performs the operational steps based on the program in the memory 22 in accordance with the present invention.

Figure 4:
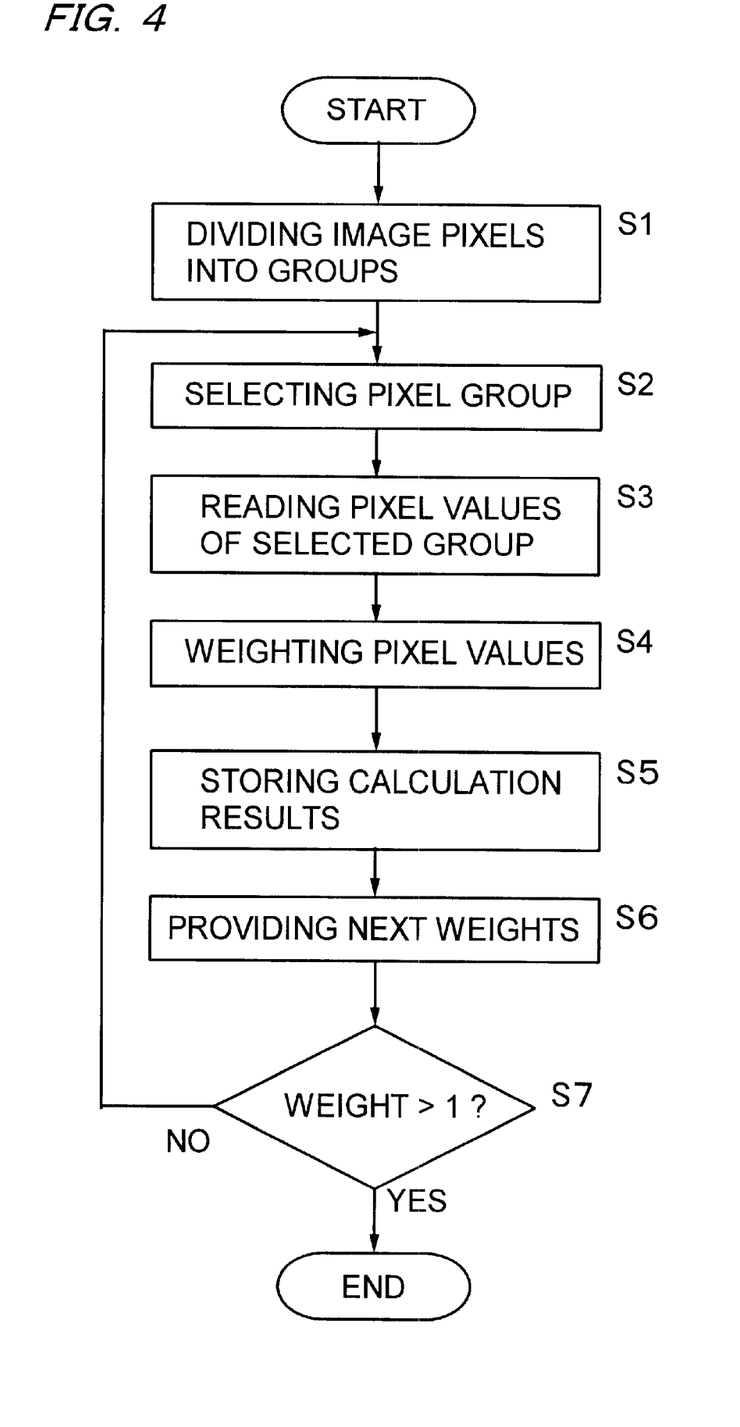
FIG. 4 is a flow chart describing the operational sequence of the apparatus shown in FIG. 2.

FIG. 4 is a flow chart describing the operational sequence of the apparatus 2 shown in FIG. 1. Beforehand, the pixel values of the first objective image are stored into both of the storage devices 4 and 8 shown in FIG. 2. They may be transferred, for example, from the hard disk drive 24 shown in FIG. 1 to the system memory 22, or the storage device 4, and to the storage device 8 under the control by the CPU 20. The pixel values of the second objective image are also preparatorily stored in the storage device 6. The CPU 20 may transfer those pixel values to the system memory 22, as the storage device 6, from the hard disk drive 24 for example.

Since the display controller 28, as described above, are cyclically reading the storage device 8 to produce the video signals, the display device 30 initially displays the first image based on the pixel values stored in the storage device 8.

Then, the read controller 10, as the dividing means of the present invention, divides at step S1 the pixels of the first and second images respectively into four groups, each of which includes the pixels dispersed locationally in the respective images. FIGS. 5A through 5D, which represent the portions of storage devices 4 and 6 in the same way as FIG. 3 described above, illustrate respective pixel groups in terms of storage location addresses.

The first pixel group defined by the read controller 10 comprises the pixels residing in even number columns and rows. Therefore, in the storage devices 4 and 6, the values of the first group pixels exist in the storage locations 46, shown as black squares in FIG. 5A, specified by even number x- and y-addresses.

The second pixel group then comprises those residing in odd number columns and rows. In the storage devices 4 and 6, the values of the second group pixels are in the storage locations 48, represented by black squares in FIG. 5B, specified by odd number x- and y-addresses.

Figure 5A:
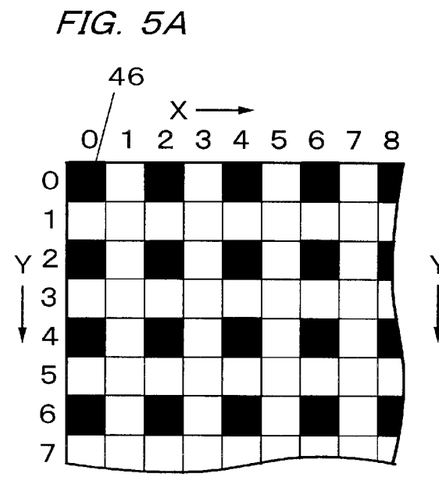
FIGS. 5A through 5D are diagrams illustrating respectively the partial arrangements of storage locations in the storage devices within the apparatus shown in FIG. 2.
Figure 5B:
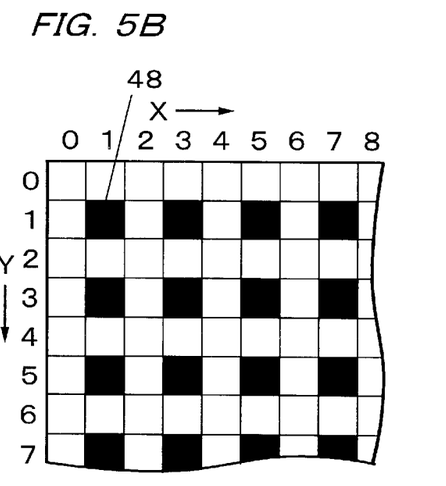
Figure 5C:
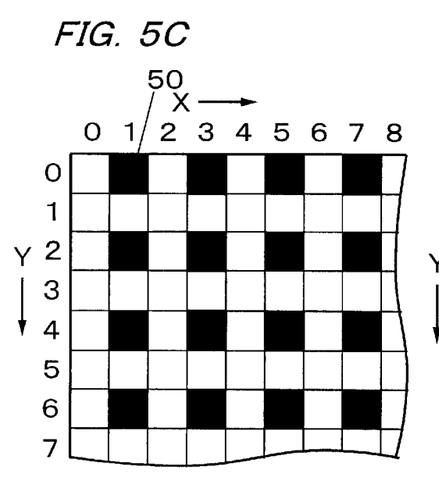

And the third pixel group comprises the pixels in odd number columns and even number rows corresponding to the storage locations 50, shown as black squares in FIG. 5C, specified by odd number x- and even number y-addresses.

Figure 5D:
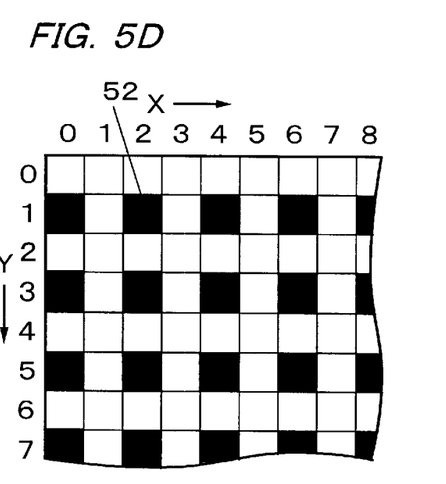

The fourth pixel group finally comprises those in even number columns and odd number rows corresponding to the storage locations 52, shown as black squares in FIG. 5D, specified by even number x- and odd number y-addresses.

After dividing the pixels of the images, the read controller 10, embodying also the selecting and reading means according to the present invention, selects one of the pixel groups, the first group here, at step S2 and then reads the values of the first group pixels of the first and second images from the storage devices 4 and 6 at step S3. The read controller 10 obtains the first group pixel values sequentially, as an example, in such a way that it accesses the even number storage location rows in the y-address order to successively read in each of these rows the values in locations 46 shown in FIG. 5A according to the x-address order.

The read controller 10, as the controlling means in accordance with the present invention, also activates the calculator 12, the weight controller 16, and the write controller 14, simultaneously with the beginning of the reading operation described above. By this activation, the weight controller 16 initially outputs, in this example, 0.99 and 0.01 as the first and second weights respectively to the calculator 12.

The calculator 12, activated by the controller 10, receives the pixel values of the first and second images at the same time from the read controller 10. The order in which the respective pixel values are fed to the calculator 12 is the same as that of the pixel value reading from the storage devices 4 and 6 by the controller 10. The calculator 12 performs weighting operation with these received pixel values using the two weights supplied by the weight controller 16 at step S4. In detail, the calculator 12 multiply the each pixel value of the first image by the first weight 0.99 provided by the weight controller 16, and the each pixel value of the second image by the second weight 0.01 to get the summation of these multiplication results.

The calculator 12 repeats this calculation for each pair of the first and second image pixel values, stored in the same x- and y-address locations in the storage devices 4 and 6, at each arrival of the paired pixel values from the read controller 10, and outputs each calculation result to the storage device 8. At step S5, the write controller 14 provides x- and y-address information for the storage device 8 synchronously to the calculation repetition by the calculator 12 so as to store the calculation results into the storage locations corresponding to the pixels in the first group.

Accordingly, when the read controller 10 completes to read all the first and second image pixel values of the first pixel group, the contents of the storage locations in the storage device 8 corresponding to the first pixel group are replaced by the pixel values provided by the calculator 12. In other words, the storage locations in the storage device 8 designated by the even number x- and y-addresses are replaced by the calculation results. Therefore, in the storage device 8 the storage locations designated by y-address 0 and x-addresses 0, 2, 4, 6, . . . shown in FIG. 3, for instance, contain the calculation results obtained by the pixel values read from the locations designated by y-address 0 and x-addresses 0, 2, 4, 6, . . . in storage devices 4 and 6, the locations of the storage device 8 designated by y-address 2 and x-addresses 0, 2, 4, 6, . . . shown in FIG. 3 contain the calculation results obtained by the pixel values read from the respective same y- and x-address locations in storage device 4 and 6, etc. On the other hand, the remaining storage locations in storage device 8 are still holding the pixel values for the second through fourth groups of the first objective image.

The display controller 28 reads such pixel values from the storage device 8 in the same way as described above to produce video signals, thereby enabling the display 30 to display the first phase image of the sequential images to form the dissolving process on the screen. In this first phase image, the pixels corresponding to those of the first pixel group represent the second image only slightly due to the ratio of the first and second weights mentioned above, and thus on the screen of the display 30 the second image is overlapped at a very low intensity on the first image in this initial processing cycle.

On the completion of the pixel value reading, the read controller 10 activates the weight controller 16 to produce the weights for the next processing cycle. The weight controller 16 decreases and increases the first and second weights respectively at a pitch of 0.01 in this example every time activated by the controller 10, and, as as result, provides 0.98 and 0.02 as the first and second weights respectively for the second processing cycle at step S6.

The read controller 10, at step S7, compares the new second weight given by the weight controller 16 with 1 and if the second weight is greater than 1 the controller 10 then quits to read the storage devices 4 and 6 to finish the dissolving process. If the second weight does not exceed 1, as in this processing stage, the read controller 10 activates itself and the other elements for the next processing cycle of steps S2 through S7.

Similarly to the first processing cycle described above, the controller 10 begins to read the pixel values of the first and second images from the storage devices 4 and 6. In this second processing cycle, however, the controller 10 selects the second pixel group at step S2 and reads the second group pixel values sequentially at step S3 in such a manner that it accesses the odd number storage location rows in the y-address order to successively read in each of these rows the values of pixels 48 shown in FIG. 5B according to the x-address order.

With the respective pairs of the first and second image pixel values of the second pixel group and the first and second weights being supplied, the calculator 12 calculates the summations of the two weighted pixel values as described above at step S4. The resultant summations or the calculated pixel values based on the values of the second pixel group is stored in the corresponding storage locations within the storage device 8 under the control by the write controller 14 at step S5.

As a result, when the read controller 10 completes to read all the second group pixel values from the storage devices 4 and 6, the storage locations in the storage device 8 designated by, for instance, y-address 1 and x-addresses 1, 3, 5, 7, . . . in FIG. 3 contain the calculation results obtained by the pixel values read from the locations designated by y-address 1 and x-addresses 1, 3, 5, 7, . . . in storage devices 4 and 6, the locations in the storage device 8 designated by y-address 3 and x-addresses 1, 3, 5, 7, . . . in FIG. 3 contain the calculation results obtained by the pixel values read from the respective same y- and x-address locations in storage devices 4 and 6, etc. Consequently, in the storage device 8 the storage locations corresponding to the first and second pixel groups are holding weighted pixel values while the other locations are containing those for the third and fourth groups of the first objective image.

The display controller 28 reads such pixel values from the storage device 8 in the same manner as described above to produce video signals, thereby enabling the display 30 to display the second phase image in the dissolving transition on the screen. In this image, the pixels corresponding to the first and second group pixels represent the second image only slightly as well due to the ratio of the first and second weights mentioned above, and thus on the screen the second image is overlapped at a very low intensity yet on the first image. However, in this second phase, the screen image pixels corresponding to both of the first and second groups include the information of the second image, so that the overlapped second image is more recognizable.

On the completion of the pixel value reading, the weight controller 16, activated by the controller 10, outputs the modified first and second weights 0.97 and 0.03 for the next processing cycle at step S6. The read controller 10 then determines the second weight still less than 1 at step S7 and thus activates itself and the other elements to perform the third processing cycle.

The controller 10 then selects the third pixel group to read the third group pixel values of the first and second image from the storage locations 50, shown in FIG. 5C, within the storage devices 4 and 6 at steps S2, S3. With the respective pairs of the first and second image pixel values of the third pixel group and the new first and second weights mentioned above being supplied, the calculator 12 calculates the summations of the respective two weighted pixel values as described above at step S4.

The resultant summations or the calculated pixel values based on the values of the third pixel group is stored in the corresponding storage locations within the storage device 8 under the control by the write controller 14. As a result, when the read controller 10 completes to read all the third group pixel values from the storage devices 4 and 6, the locations in the storage device 8 corresponding to the third pixel group contain the calculation results obtained by the pixel values read from the storage locations 50 shown in FIG. 5C.

Consequently, in the storage device 8 the storage locations corresponding to the first through third pixel groups of the objective images are now holding the pixel values that are provided by the calculator 12. Based on these pixel values and others, the display controller 28 displays the third phase image in the dissolving process with the overlapped second image more recognizably on the first image while further weakens the first image on the screen of the display 30.

Since the weight controller 16 provides the first and second weights 0.96 and 0.04 for the fourth processing cycle at step S6 and the second weight is still less than 1, steps S2 through S7 are repeated further wherein the read controller 10 reads the pixel values of the fourth pixel group from the locations 52, shown in FIG. 5D, in the storage devices 4 and 6. The calculator 12 then calculates the summations of weighted pixel values based on the pixel values and the weights supplied by the controllers 10 and 16 respectively. The calculation results are stored in the corresponding locations within the storage device 8 under the control by the write controller 14.

Accordingly, in this processing stage all the pixel values stored in the storage device 8 are replaced with those provided by the calculator 12, and the display controller 28 displays the fourth phase image in the dissolving transition with the overlapped second image further recognizably on the first image and the first image by further decreased intensity on the screen of the display 30.

Since the weight controller 16 provides the new first and second weights 0.95 and 0.05 for the fifth processing cycle at step S6 and the second weight is still less than 1, steps S2 through S7 are further repeated. Namely, the read controller reads the pixel values of the first pixel group again in this cycle. The calculator 12 then calculates the summations of weighted pixel values based on the pixel values and the weights supplied by the controllers 10 and 16 respectively. The calculation results are stored in the corresponding locations within the storage device 8 under the control by the write controller 14.

Therefore, in the storage device 8 the pixel values stored at the storage locations corresponding to the first pixel group are replaced again with those provided by the calculator 12, and the display controller 28 displays the fifth phase image in the dissolving transition with the overlapped second image further recognizably on the first image and the first image by further decreased intensity on the screen due to the aforementioned new weights provided by the weight controller 16.

In the same way, steps S2 through S7 are repeated until the second weight exceeds 1, and in every cycle the first and second weights are decreased and increased respectively according to the increase in the repetition count, causing the overlapped second image to gradually increase its intensity while the first image to progressively decrease the same on the screen of the display 30. As a result, a fade-in transition of the second image and a fade-out transition of the first image are displayed simultaneously on the display screen.

Since the pixels of each objective image, namely the first or second image, are divided into four groups and the images at the respective phases in the dissolving transition are provided by the calculations on only one of the pixel groups, each image displayed on the screen can be created four times faster than that created by using all the pixel values of the objective images. Therefore, the sequential images are displayed at sufficiently short time intervals, or high frame rates, to provide smooth dissolve effects on the screen.

In each processing cycle described above, the image is displayed on the display screen as a mixture of pixels of the values provided by the different weights. However, the weight differences are slight, the pixels are very small and dispersed in each group, and further the time periods for displaying respective sequential images are very short, so that the effects of the different weights for the pixels on the screen are negligible.

It should be understood that, although the weights are changed every processing cycle by the weight controller 16 in the embodiment described above, the new first and second weights may also be applied to the pixel values every two, three, or four processing cycles. In such a weight control, the weights are unchanged for some consecutive cycles, but the number of pixels having newly calculated values increases every cycle, so that the images on the screen vary their intensities every processing cycle. Furthermore, even if the first and second weights are changed intermittently as mentioned above, they are still decreased and increased respectively as the processing repetition progresses, resulting in similar dissolve effects on the display screen.

When the read controller 10 finally quits to read the storage devices 4 and 6 as a result of the comparison of the second weight with the criterion at step S7, in the image on the display screen the pixel values corresponding to the remaining three pixel groups are those obtained by using the second weights less than 1 and the corresponding first weights. Therefore, the image on the screen at the end of the dissolve transition is not yet exactly turned to the second image. However, since the differences between the pixel values corresponding to the three-pixel groups and the correct values are very small, it is actually impossible to distinguish the final image from the second image on the screen. It is also possible for those skilled in the art to simply modify the embodiment so as to apply 0 and 1 as the final first and second weights to the pixel values of the remaining three groups read from the storage devices 4 and 6, thereby displaying exactly the second image at the end of the dissolve transitions.

In the preferred embodiment described above, although the pixel values of the first through fourth pixel groups of the objective images are cyclically read in the group number order from the storage devices 4 and 6 to be processed in the same order, the present invention does not limit the reading and processing orders to this.

Although the apparatus 2, as mentioned above, is designed to handle monochromatic images, for those skilled in the art will recognize that the invention may also be implemented in an apparatus capable of color image presentation to provide dissolving color pictures on its display screen. As is well known in the art, a color image is also formed by pixels, wherein a combination of three neighboring pixels corresponds to one pixel in the monochromatic image, and the respective pixels within each three-pixel combination correspond to red, green, and blue. Therefore, the pixels of a color image can be separated into three sets that comprise the pixels corresponding to one of the colors respectively, enabling the procedures for monochromatic images described above being performed for the respective pixel sets individually. Thereafter, the weighted pixel values of the three pixel sets may be combined so as to display color images at respective dissolve transition phases to provide smooth dissolving effects on the display screen.

Dissolving transitions for color images may be achieved in another form described hereinafter in accordance with the present invention. The pixels of an objective color image are supposed to be arranged in such a manner that respective pixel rows comprise the successive combinations of the three color pixels, namely the pixels corresponding to red, green, and blue respectively as mentioned above, in each combination the color pixels being arranged in the sequence of red, green, and blue for example. On the basis of this pixel arrangement, the pixel values of the first and second color images are stored in the storage devices 4 and 6, and the pixels of the color images are divided into four pixel groups as an example similarly to those of monochromatic images described above.

Therefore, in this case the storage locations 46 shown in FIG. 5A contain the first group pixel values respectively as well, but the locations 46 do not always correspond to the same color pixels. For example the locations 46 designated by the x-addresses of 0, 6, . . . contain the values for red pixels, those designated by the x-addresses of 2, 8, . . . the values for blue pixels, and those designated by the x-addresses of 4, . . . the values for green pixels. Similarly, the storage locations 48, 50, and 52 shown in FIGS. 5B through 5D contain the second through fourth group pixel values respectively, but those locations 48, 50, and 52 do not always correspond respectively to the same color pixels.

However, the repeated weighting procedures for the respective pixel groups, identical with those for the monochromatic image dissolve effects described above, result in the first and second color images gradually increasing and decreasing their intensities respectively as dissolving effects on the display screen.

Figure 6:
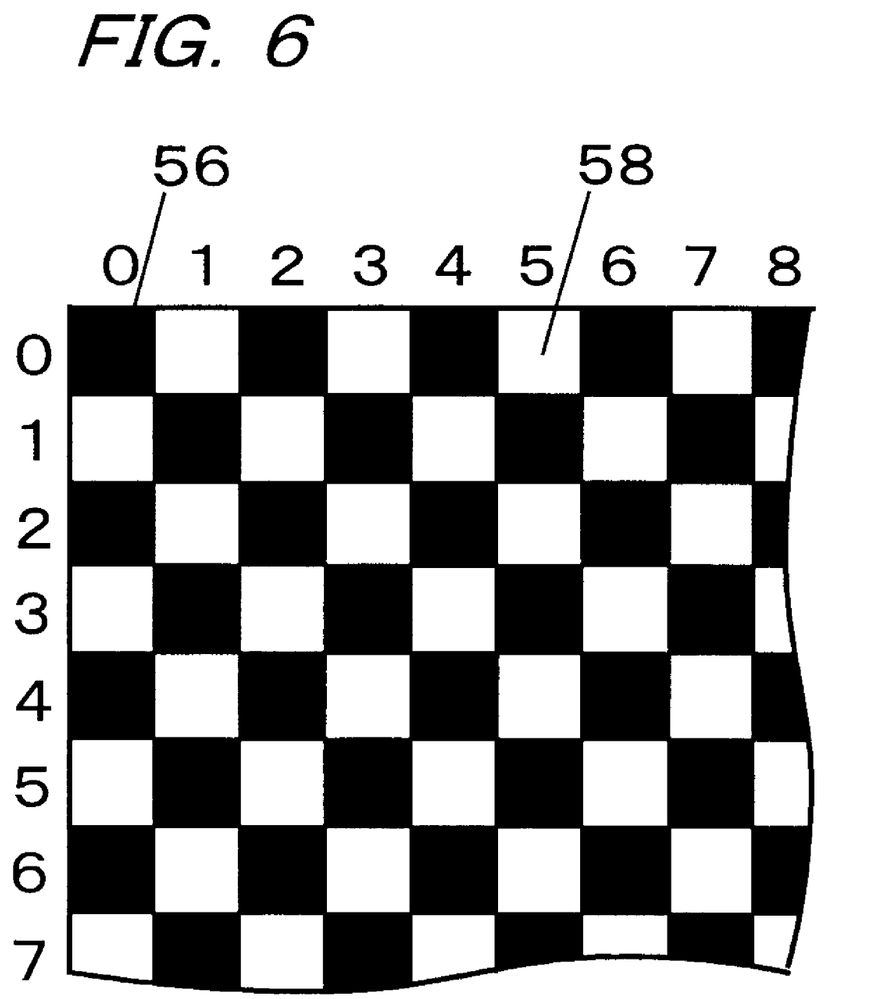
FIG. 6 is a diagram showing partly the pixel arrangement of an image in which the pixels are divided into two groups according to the embodiment of the present invention.

Although in the embodiment described above the pixels of the first and second images are divided into four groups, the pixels may also be divided into two groups to provide smooth dissolve effects on the screen. FIG. 6 illustrates the pixels of an image divided dispersedly into two groups by the read controller 10 shown in FIG. 2 according to the second preferred embodiment of the present invention. In FIG. 6, pixels 56, 58 are represented by small squares arranged in a matrix, and the pixels 56 shown as black squares, residing in even number columns and rows or in odd number columns and rows, belong to the first pixel group, and the pixels 58, residing in odd number columns and even number rows or in even number columns and odd number rows, belong to the second pixel group.

The read controller 10 selects, in this second embodiment, the two pixel groups alternately to read the values of the pixels in the first and second groups respectively from the storage devices 4 and 6, which are holding the pixel values of the first and second images respectively. The repeated processing procedures, including weighting operations for the pixel values, are performed similarly to those of the first embodiment described above, permitting smooth dissolving transitions for the first and second images to be displayed on the screen of the display 30.

Since the pixels of each objective image are divided into two groups in the second embodiment as mentioned above and the respective images at the phases in the dissolving transitions are provided by the calculations on only one of the pixel groups, each image displayed on the screen can be created two times faster than that created according to the prior art, thereby allowing the respective transition phase images to be displayed at sufficiently short time intervals to achieve smooth dissolve effects on the display screen.

In accordance with the present invention, the pixels may be divided into two groups differently in such a manner that the first group comprise the pixels in even number columns while the second group those in odd number columns, or the first group comprise the pixels in even number rows while the second group those in odd number rows. Unlike the aforementioned pixel grouping, this type reduces the dispersity of the pixels in the image but increases the simplicity in the read control procedures performed by the controller 10.

It should be appreciated that the pixels in each group may be dispersed not necessarily in order but at random with respect to their locations on the image according to the present invention.

The total number of the pixel groups is not restricted to two or four as in the embodiment described above but may be three, five, and others. The number is suitably selected, for instance, in accordance with the performances of the hardware and/or software implementing the invention.

If all the pixel values of the first image are the same, a simple fade-in image is observed on the display screen, while a simple fade-out image on the screen if all the pixel values of the second image are the same. Such a plain fade-in or fade-out transition can also be carried out by performing the multiplications of the pixel values by either of the first and second weights without the succeeding summations in the calculator 12, thereby simplifying the apparatus configurations.

It will thus be seen that the preferred embodiments of the present invention overcome the drawbacks of the prior art mentioned above. As many apparently widely different embodiments of the invention may be made without departing from the spirit and scope thereof, it is to be understood that the invention is not limited to the specific embodiments thereof except as defined in the appended claims.

What is claimed is:

1. A method for dissolving an image on a display screen by providing sequential images to be successively displayed on the screen to form the dissolving transition of the objective image, the respective sequential images being created through applying a progressively-varied weight to the pixel values of the objective image, which is composed of a two-dimensional pixel array, comprising the steps of:
    (a) dividing the objective image pixels into a plurality of groups, the pixels in each group being dispersed in the image;
    (b) selecting one of the pixel groups;
    (c) reading all the pixel values of the selected group from first storage means;
    (d) multiplying the pixel values read from the first storage means by a weight respectively;
    (e) storing the weighted pixel values respectively in the storage locations, corresponding to the selected pixel group, within second storage means;
    (f) repeating steps (b) through (e) wherein the respective pixel groups of the objective image are selected cyclically and the weight is increased or decreased gradually as the repetition of the steps progresses; and
    (g) in parallel with step (f), cyclically reading the weighted pixel values from the second storage means, in each reading cycle the pixel values corresponding to the pixel groups being read in a predetermined order to display one of the sequential images on the screen.

2. The method according to claim 1 wherein the pixels of the objective image are divided into first and second groups, the first group comprising the pixels residing in even number columns or rows while the second group comprising those residing in odd number columns or rows.

3. The method according to claim 1 wherein the pixels of the objective image are divided into first and second groups, the first group comprising the pixels residing in even number columns and rows and those in odd number columns and rows while the second group comprising the pixels residing in odd number columns and even number rows and those in even number columns and odd number rows.

4. The method according to claim 1 wherein the pixels of the objective image are divided into first through fourth groups, the first group comprising the pixels residing in even number columns and rows, the second group comprising those in odd number columns and rows, the third group comprising those in odd number columns and even number rows, and the fourth group comprising those in even number columns and odd number rows.

5. An apparatus for dissolving an image on a display screen by providing sequential images to be successively displayed on the screen to form the dissolving transition of the objective image, the respective sequential images being created through applying a progressively-varied weight to the pixel values of the objective image, which is composed of a two-dimensional pixel array, comprising:
    first storage means for storing the values of pixels representing the objective image;
    second storage means for storing weighted pixel values;
    means for dividing the objective image pixels into a plurality of groups, the pixels in each group being dispersed in the image;
    means for selecting one of the pixel groups;
    means for reading all the pixel values of the selected group from the first storage means;
    means for multiplying a weight and the respective pixel values read from the first storage means by the reading means;
    means for storing the weighted pixel values, provided by the multiplying means, respectively in the storage locations, corresponding to the selected pixel group, within the second storage means;
    means for controlling to repeatedly activate the selecting, the reading, the multiplying, and the storing means, wherein the respective pixel groups of the objective image are selected cyclically and the weight is increased or decreased gradually as the repetition of the activation for the respective means progresses; and
    means for cyclically reading, in parallel with the controlling means, the weighted pixel values from the second storage means, in each reading cycle the pixel values corresponding to the pixel groups being read in a predetermined order to display one of the sequential images on the screen.

6. The apparatus according to claim 5 wherein the dividing means divides the pixels of the objective image into first and second groups, the first group comprising the pixels residing in even number columns or rows while the second group comprising those residing in odd number columns or rows.

7. The apparatus according to claim 5 wherein the dividing means divides the pixels of the objective image into first and second groups, the first group comprising the pixels residing in even number columns and rows and those in odd number columns and rows while the second group comprising the pixels residing in odd number columns and even number rows and those in even number columns and odd number rows.

8. The apparatus according to claim 5 wherein the dividing means divides the pixels of the objective image into first through fourth groups, the first group comprising the pixels residing in even number columns and rows, the second group comprising those in odd number columns and rows, the third group comprising those in odd number columns and even number rows, and the fourth group comprising those in even number columns and odd number rows.

9. A computer readable medium storing a program for dissolving an image on a display screen by providing sequential images to be successively displayed on the screen to form the dissolving transition of the objective image, the respective sequential images being created through applying a progressively-varied weight to the pixel values of the objective image, which is composed of a two-dimensional pixel array, the program being causative of a computer operation including the steps of:

(a) dividing the objective image pixels into a plurality of groups, the pixels in each group being dispersed in the image;

(b) selecting one of the pixel groups;

(c) reading all the pixel values of the selected group from first storage means;

(d) multiplying the pixel values read from the first storage means by a weight respectively;

(e) storing the weighted pixel values respectively in the storage locations, corresponding to the selected pixel group, within second storage means;

(f) repeating steps (b) through (e) wherein the respective pixel groups of the objective image are selected cyclically and the weight is increased or decreased gradually as the repetition of the steps progresses; and (g) in parallel with step (f), cyclically reading the weighted pixel values from the second storage means, in each reading cycle the pixel values corresponding to the pixel groups being read in a predetermined order to display one of the sequential images on the screen.

10. The medium according to claim 9 wherein the pixels of the objective image are divided into first and second groups, the first group comprising the pixels residing in even number columns or rows while the second group comprising those residing in odd number columns or rows.

11. The medium according to claim 9 wherein the pixels of the objective image are divided into first and second groups, the first group comprising the pixels residing in even number columns and rows and those in odd number columns and rows while the second group comprising the pixels residing in odd number columns and even number rows and those in even number columns and odd number rows.

12. The medium according to claim 9 wherein the pixels of the objective image are divided into first through fourth groups, the first group comprising the pixels residing in even number columns and rows, the second group comprising those in odd number columns and rows, the third group comprising those in odd number columns and even number rows, and the fourth group comprising those in even number columns and odd number rows.

* * * * *